(12) United States Patent
Fröberg Olsson et al.

(10) Patent No.: US 10,291,375 B2
(45) Date of Patent: May 14, 2019

(54) METHODS AND NODES FOR COMMUNICATION OF A MESSAGE OVER A RADIO LINK

(71) Applicant: Telefonaktiebolaget LM Ericsson (publ), Stockholm (SE)

(72) Inventors: Jonas Fröberg Olsson, Ljungsbro (SE); Erik Eriksson, Linköping (SE); Pål Frenger, Linköping (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 26 days.

(21) Appl. No.: 15/526,432

(22) PCT Filed: Oct. 5, 2015

(86) PCT No.: PCT/EP2015/072942
§ 371 (c)(1),
(2) Date: May 12, 2017

(87) PCT Pub. No.: WO2017/059885
PCT Pub. Date: Apr. 13, 2017

(65) Prior Publication Data
US 2018/0302200 A1    Oct. 18, 2018

(51) Int. Cl.
*H04L 1/00*    (2006.01)
*H04L 5/00*    (2006.01)
*H04W 24/10*    (2009.01)

(52) U.S. Cl.
CPC ............ *H04L 5/0048* (2013.01); *H04L 1/004* (2013.01); *H04L 1/0061* (2013.01); *H04L 5/0046* (2013.01); *H04W 24/10* (2013.01)

(58) Field of Classification Search
CPC ... H04L 1/0061; H04L 1/0041; H04L 1/0072; H04L 1/0083; H04L 1/0038;
(Continued)

(56) References Cited

U.S. PATENT DOCUMENTS 8,745,476 B1 *   6/2014  Matiash ............ H03M 13/091
                                                     714/752
2004/0123221 A1 * 6/2004  Huffman ........... H03M 13/093
                                                     714/776
(Continued)

FOREIGN PATENT DOCUMENTS

EP          2775649 A2    9/2014

OTHER PUBLICATIONS

International Search Report and Written Opinion of the International Searching Authority for International Application No. PCT/EP2015/072942 (dated Jan. 29, 2016).

*Primary Examiner* — Mohamed A Kamara
(74) *Attorney, Agent, or Firm* — Patent Portfolio Builders, PLLC (57) ABSTRACT

A network node, a User Equipment, UE and methods therein, for handling a message transmitted over a radio link. The network node generates a first set of identity check bits for a first part of the message, based on the message and a first check identity, and further generates a second set of identity check bits valid for a second part of the message, based on the message, the first set of identity check bits and a second check identity. The message is then transmitted over the radio link with the first and second sets of identity check bits attached. The UE performs a first verification check using the second set of identity check bits and the second check identity, and performs a second verification check using the first set of identity check bits and the first check identity. The UE then handles the second message part based on the first verification check and the first message part based on the second verification check.

32 Claims, 6 Drawing Sheets

(58) Field of Classification Search
CPC .... H04L 49/552; H04L 49/555; H04W 12/02; H04W 12/10; H04W 28/04; H04B 7/0632; H04B 7/0814
See application file for complete search history.

(56) References Cited

U.S. PATENT DOCUMENTS

| | | | |
|---|---|---|---|
| 2008/0037540 A1* | 2/2008 | Ngo | H04L 1/0041 370/392 |
| 2008/0225965 A1* | 9/2008 | Pi | H04L 1/0003 375/260 |
| 2009/0077457 A1* | 3/2009 | Ramesh | H03M 13/2975 714/807 |
| 2011/0194511 A1 | 8/2011 | Chen et al. | |
| 2011/0271169 A1* | 11/2011 | Pi | H03M 13/09 714/807 |
| 2016/0329989 A1* | 11/2016 | Li | H04L 1/0061 |

* cited by examiner

METHODS AND NODES FOR COMMUNICATION OF A MESSAGE OVER A RADIO LINK

CROSS-REFERENCE TO RELATED APPLICATION

This application is a 35 U.S.C. § 371 national stage application of PCT International Application No. PCT/EP2015/072942, filed on Oct. 5, 2015,the disclosure and content of which is incorporated by reference herein in its entirety.

TECHNICAL FIELD

The present disclosure relates generally to a network node of a radio network, a User Equipment, UE, and methods therein, for communication of a message over a radio link.

BACKGROUND

For some years, different types of radio networks for wireless communication have been developed to provide radio access for various wireless terminals and devices in different areas. The radio networks are constantly improved to provide better coverage and capacity, to meet demands of increasingly advanced services and devices, e.g. smartphones and tablets, which may require considerable amounts of bandwidth and resources for data transport and control signaling in the networks. A limiting factor for capacity of a radio network, or for radio communication in general, is the amount of available radio resources, e.g. in terms of time, frequency bandwidth and transmit power, and the capacity of a radio network can be improved by more efficient usage of such radio resources.

In this disclosure, the term "User Equipment, UE" will be used to denote any wireless device capable of communicating radio signals with a radio network. For example, a UE in this context may be a mobile phone handled by a human or a Machine-to-Machine, M2M, type of device operating automatically such as a sensor, counter or measuring entity. Further, the term "network node" will be used to denote any node of a radio network capable of communicating radio signals with a UE. For example, a network node in this context may be a base station, an eNodeB, an access point, a relay, etc., depending on the terminology and type of network used. However, the UEs and network nodes described herein are not limited to the above examples.

As mentioned above, it is of interest for network operators to improve capacity in their networks by utilizing the available radio resources as efficiently as possible. Another area of interest is to ensure correct and reliable reception when data is transmitted from a data sending node to a data receiving node, if this is deemed important. The amount of errors in the data communication can be reduced by adding extra control bits to the data which can be used for error correction and/or for checking that the received data has been received correctly. A common method for error detection is the well-known Cyclic Redundancy Check, CRC, where the data sending node attaches CRC bits, also referred to as parity check bits, to the data indicating basically a checksum of the transmitted data which can be checked by the data receiving node to verify correct reception of the data. This procedure is commonly referred to as CRC attachment.

For control messages, such as assignments of radio resources to UEs transmitted on a control channel, CRC attachment can also be utilized by a network node to address a message to a particular UE, by embedding an identity associated with the UE in the CRC bits of the CRC attachment. An identity called Radio Network Temporary Identity, RNTI, is commonly used as UE identity in the CRC attachment of control messages. Thereby, only the addressed UE will verify the message based on its identity, e.g. its RNTI, and a CRC check made by other UEs using other identities, e.g. RNTIs, will not verify the message since their identities do not match the CRC attachment of the message. It is also possible for more than one UE to use the same UE identity, e.g. RNTI, thus enabling the network node to address a group of UEs in the same message.

Figure 1:
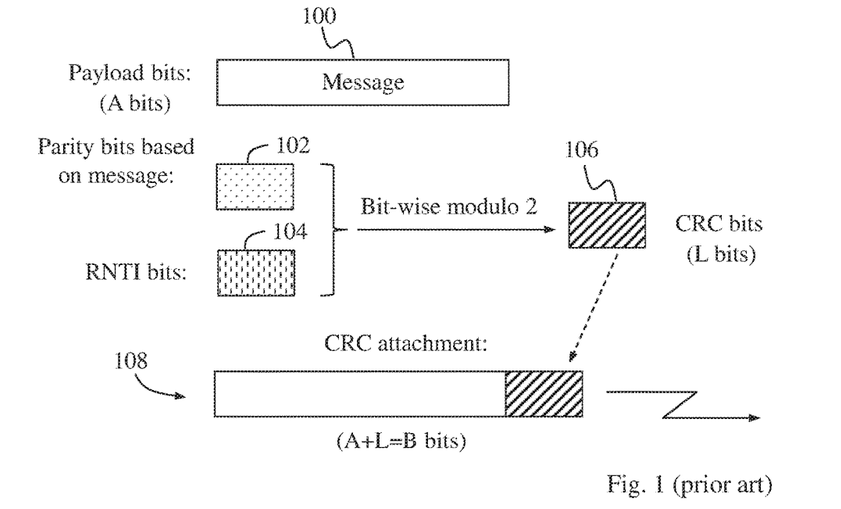
FIG. 1 is a schematic illustration of a conventional CRC attachment for addressing a control message to a UE, according to the prior art.

FIG. 1 illustrates an example of how the above-described CRC attachment may be created by a network node in a conventional manner, for addressing a message 100 with payload bits to a certain UE. The number of payload bits in the message 100 is denoted A. The network node creates a set of parity bits 102 based on the payload in the message 100, typically a checksum of the payload bits. The network node also obtains a set of RNTI bits 104 from the RNTI of the UE, and merges the parity bits 102 and the RNTI bits 104 by means of an operation called "bit-wise modulo 2 ", which generates a set of CRC bits 106 in which the parity bits 102 and the RNTI bits 104 are thus embedded. The number of CRC bits 106 is denoted L. The network node then transmits the message 100 with the CRC bits 106 attached in a transmission 108. The total number of bits in transmission 108 is denoted B which is thus the sum of A and L, as indicated in the figure. The above-mentioned bit-wise modulo operation is well-known in the art and as an example the bit-wise modulo 2 of "001" and "101" equals "100".

However, it is a problem that a large amount of control messages must be transmitted to instruct various UEs to operate according to the control messages, particularly when several different UEs need to be instructed in different ways, e.g. individually. The transmission of such control messages and other dedicated messages, which may be referred to as signaling overhead, naturally consumes precious radio resources which could otherwise be available for data transport, thereby limiting the maximum capacity of the radio network. Further, much interference may be generated in the network by the transmission of numerous control messages and other messages to different UEs.

SUMMARY

It is an object of embodiments described herein to address at least some of the problems and issues outlined above. It is possible to achieve this object and others by using a network node, a UE, and methods therein as defined in the attached independent claims.

According to one aspect, a method is performed by a network node of a radio network, for transmitting a message over a radio link. In this method the network node generates a first set of identity check bits which are valid for a first part of the message, based on the message and a first check identity. The network node also generates a second set of identity check bits which are valid for a second part of the message, based on the message, the first set of identity check bits and a second check identity. The network node then transmits the message with the first and second sets of identity check bits attached over the radio link.

Thereby, different UEs receiving the message are able to process or ignore different parts of the message depending on the first and second check identities. It is thus an advantage that different parts of the same message can be addressed to different UEs by means of the first and second check identities and the first and second sets of identity check bits attached to the message, thereby providing a flexible and efficient way of conveying information and/or instructions to the UEs. A mechanism for verifying correct reception of the message parts is also provided.

According to another aspect, a network node is arranged to transmit a message over a radio link. The network node comprises a processor and a memory. The memory comprises instructions executable by said processor whereby the network node is operative to:
generate a first set of identity check bits valid for a first part of the message, based on the message and a first check identity,
generate a second set of identity check bits valid for a second part of the message, based on the message, the first set of identity check bits and a second check identity, and
transmit the message with the first and second sets of identity check bits attached over the radio link.

According to another aspect, a method is performed by a User Equipment, UE, for handling a message transmitted by a network node over a radio link. In this method the UE receives the message with a first set of identity check bits and a second set of identity check bits attached, wherein the UE has been configured with a first check identity and a second check identity. The UE then performs a first verification check using the second set of identity check bits and the second check identity, and also performs a second verification check using the first set of identity check bits and the first check identity. The UE further handles a second part of the message based on the first verification check, and also handles a first part of the message based on the second verification check.

According to another aspect, a User Equipment, UE is arranged to handle a message transmitted by a network node over a radio link. The UE comprises a processor and a memory. The memory comprises instructions executable by said processor whereby the UE is operative to:
receive the message with a first set of identity check bits and a second set of identity check bits attached, wherein the UE has been configured with a first check identity and a second check identity,
perform a first verification check using the second set of identity check bits and the second check identity,
perform a second verification check using the first set of identity check bits and the first check identity,
handle a second part of the message based on the first verification check, and
handle a first part of the message based on the second verification check.

The above network node, UE, and methods therein may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided that makes it possible to reduce signaling overhead and the number of messages with CRC attachments or the like, transmitted from a network node to various UEs, as compared to when conventional CRC attachment is employed as described above. Thereby, capacity can be improved in the network since precious radio resources otherwise consumed by the messages and their CRC attachments on the radio link will instead be available for transmission of data or other information. This can be achieved by transmitting a message with different parts addressed to different UEs by means of identity check bits attached to the message, instead of transmitting several messages separately to the UEs.

For example, one part of the message may be addressed to one or more UEs while another part may be addressed to one or more other UEs by generating different sets of identity check bits based on the message and different check identities valid for different UEs. Thereby, each UE can verify one or more relevant parts of the message, depending on the check identities, and process the verified part(s) accordingly. It is thus possible for a UE to verify more than one part of the message if the UE is configured with corresponding check identities. It is thus an advantage of this solution that it provides a flexible and efficient way of conveying different information and/or instructions to different UEs in the same message, by addressing different parts of the same message to different UEs by means of the first and second check identities and the first and second sets of identity check bits attached to the message. At the same time, the solution provides a mechanism for verifying correct reception of the relevant message parts in the UEs.

Throughout this disclosure, the term "message" is used to represent any payload information, e.g. an instruction in a control message, that is to be processed by the addressed UEs, and the solution is not limited to any particular type of information in the message. Some illustrative but non-limiting examples of messages in this context may include assignments for data transmission or reception, referred to as "data assignment", and instructions related to measurement of reference signals, referred to as "measurement assignment".

Figure 2:
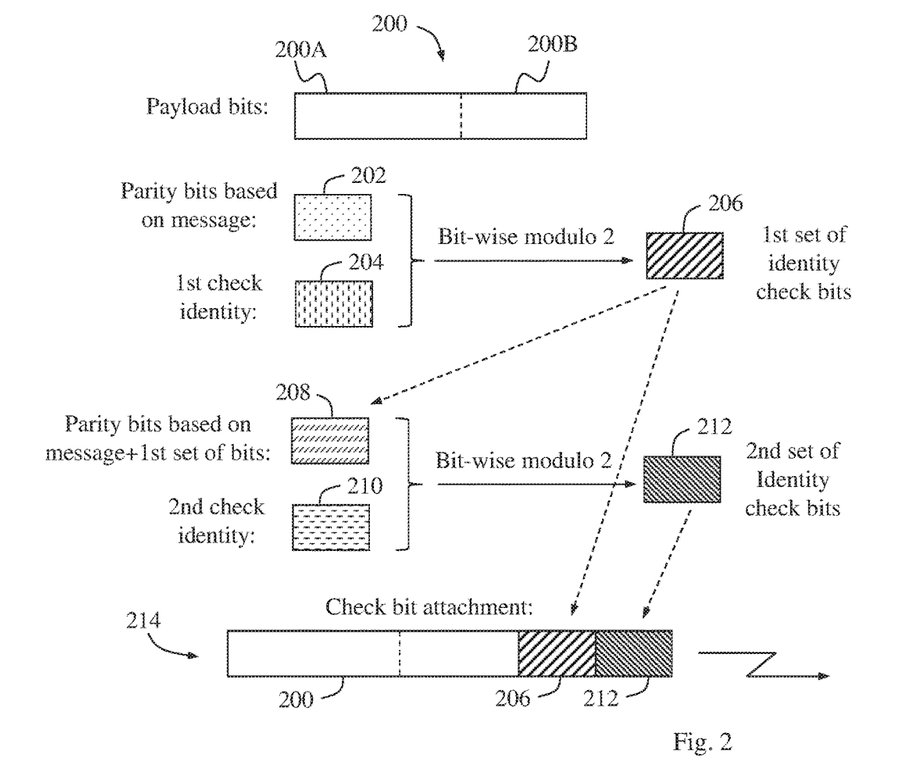
FIG. 2 illustrates an example of a CRC attachment performed by a network node, according to some possible embodiments.

It will now be described in more detail how the above-mentioned identity check bits can be generated by a network node for a message to be transmitted comprising two parts, with reference to FIG. 2. In this example, only two parts of the message are discussed for simplicity, e.g. comprising a data assignment and a measurement assignment, respectively, although it should be noted that the same procedure may also be applied for more than two message parts in the manner described herein. The schematically illustrated message 200 is comprised of payload bits which are arranged in the two message parts 200A and 200B which will be addressed in a differentiated manner as follows. The parts 200A, 200B are shown to be adjacent in this example, although they may also be partly overlapping or separated by other bits.

First, the network node obtains a set of parity bits 202 based on the payload in the message 200, typically a checksum of the payload bits, which may be done basically as described for FIG. 1. The network node then performs the above-described modulo operation "bit-wise modulo 2" on the parity bits 202 of the message and a first check identity 204, to generate a first set of identity check bits 206 which is valid for the first part 200A of the message.

In a next stage of this procedure, the network node obtains another set of parity bits 208 based on the payload in the message 200 and the first set of identity check bits 206. The network node then performs the operation "bit-wise modulo 2" on the parity bits 208 and a second check identity 210, to generate a second set of identity check bits 212 which is valid for the second part of the message. The first and second identity check bits 206 and 212 may be generated as CRC bits although the solution is not limited thereto. Further, the first and second check identities 204 and 210 are identities associated with certain UEs to be addressed in a differentiated manner such that the first check identity 204 may e.g. be configured in one specific UE and the second check identity 210 may be configured in another UE or in a group of UEs which may even include the first-mentioned UE. For example, the first and second check identities 204 and 210 may, without limitation, be generated from RNTIs or similar which may be individual identities or group identities.

The message is then transmitted with the first and second identity check bits 206 and 212 attached, as indicated by numeral 214. The first set of identity check bits 206 is attached after the message 200 and the second set of identity check bits 212 is attached after the first set of identity check bits 206, as shown in the figure. However, the check bits 206, 212 may be attached in any other positions and the solution is not limited in this respect. Thereby, any UE that is configured with the second check identity 210 is able to verify the second part 200B of the message by means of the second set of identity check bits 212, and a UE that is configured with both the second check identity 210 and the first check identity 204 is able to verify both parts 200A, 200B of the message by means of the first and second sets of identity check bits 206, 212. An example of how such verifications can be done will be described later below with reference to FIG. 7.

An example of how the solution may be employed in terms of actions in a procedure performed by a network node N for transmitting a message over a radio link so that different parts of the message are addressed to different UEs, will now be described with reference to the flow chart in FIG. 3. The network node N and various UEs are schematically illustrated on top of FIG. 3. This procedure can thus be used to accomplish the functionality described above, and some possible but non-limiting embodiments will also be described below.

A first action 300 illustrates that the network node generates a first set of identity check bits valid for a first part of the message, based on the message and a first check identity. In this action, the first set of identity check bits and the first check identity correspond to the bits 206 and the check identity 204, respectively, as shown in FIG. 2. In a next action 302, the network node generates a second set of identity check bits valid for a second part of the message, based on the message, the first set of identity check bits and a second check identity. In this action, the second set of identity check bits and the second check identity correspond to the bits 212 and the check identity 210, respectively, as shown in FIG. 2. A final action 304 illustrates that the network node transmits the message with the first and second sets of identity check bits attached over the radio link, which corresponds to the transmission of the message 200 plus attachments 206 and 212 as indicated by numeral 214 in FIG. 2.

In the above procedure, it is possible to employ various optional embodiments as follows, and with further reference to FIG. 2. In some possible embodiments, the first part 200A of the message may comprise a data assignment for transmitting or receiving data on a subsequent radio resource and the first check identity 204 may be used to address a first UE. Further, the second part 200B of the message may comprise control information and the second check identity 210 may be used to address the first UE and at least a second UE. For example, the second check identity 210 may be used to address a group of multiple UEs being configured with the second check identity 210 where the first UE is included in the group. In a further possible embodiment, the above control information in the second message part 200B may comprise a measurement assignment for measuring or transmitting a reference signal.

In further possible embodiments, the second set of identity check bits 212 may be used to instruct a group of UEs using, i.e. being configured with, the second check identity 210, to process the second part 200B of the message, and the first set of identity check bits 206 may be used to instruct a single UE using or being configured with the first check identity 204, to process the first part 200A of the message.

In another possible embodiment, the first check identity 204 may in the above case be generated from an identity of the single UE, e.g. an individual RNTI, and the second check identity 210 may be generated from an identity of the group of UEs, e.g. a group RNTI. In further possible embodiments, if the first check identity 204 has M bits and the second check identity 210 has L bits including said M bits, the first and second check identities 204, 210 may be used to address one of up to $2^M$ groups of UEs and one of up to $2^{L-M}$ UEs in each group. An illustrative example of how the latter embodiment may be realized will be described later below.

In further possible embodiments, the first part 200A of the message may comprise a data assignment for transmitting or receiving data on a subsequent radio resource and the first check identity 204 may be used by a first UE, while the second part 200B of the message may comprise a data assignment for transmitting or receiving data on another subsequent radio resource and the second check identity 210 may be used by a second UE.

In further possible embodiments, the first set of identity check bits 206 may be an inner Cyclic Redundancy Check, CRC attachment following the message and the second set of CRC bits 212 may be an outer CRC attachment following the first set of identity check bits 206, as illustrated by numeral 214.

In another possible embodiment, the network node may configure a UE with the first check identity 204 for use in blind decoding of one or more assignment candidates in a predefined search space. In another possible embodiment of the procedure of FIG. 3, the first and second sets of identity check bits are generated as Cyclic Redundancy Check, CRC bits.

In another possible embodiment, the first and second sets of identity check bits 206, 212 may be used by the network node to control processing of subsequently transmitted Medium Access Control, MAC, Protocol Data Units, PDUs. Some examples of this embodiment may be as follows.

In one example, the UE may be configured with a first and a second check identity to be used when processing a data message including control information received on a physical data channel. The data message may be transmitted in a transport block including a MAC PDU and one or two sets of identity check bits. The MAC PDU may include two or more MAC elements among which at least one MAC element is a MAC control element. The UE performs a first and a second verification check on a first and second set of bits of the data message. The UE can then process the MAC PDU based on the result of first and second CRC check according to table 1 below.

TABLE 1

Verification checks performed by the UE.

| First verification check | Second verification check | Processing |
| --- | --- | --- |
| Un-successful | Un-successful | No processing of MAC PDU (decoding error) |
| Un-successful | Successful | No processing of MAC PDU (decoding error) |
| Successful | Un-successful | Process MAC PDU obtaining only MAC control elements |
| Successful | Successful | Process MAC PDU obtaining all MAC elements |

In other examples of this embodiment, the UE may be configured with multiple check identities wherein a successful verification check using a specific check identity can be attained with respect to different levels of processing the message. A level of processing may in some examples be defined, e.g. configured, as a set of control elements wherein a level x includes level y if x>y. If the first verification check is successful then the MAC PDU is processed up to Level 1 (extracting MAC control elements in first set). If the second verification check is also successful then the MAC PDU is processed up to Level 2, and so forth. As shown in the above table, some of the possible outcomes of the first and second verification checks are treated as decoding errors and will not lead to any processing of the received message. It may thus be only certain combinations of verification check outcomes that result in any processing of the MAC PDU.

It was mentioned above that the first and second check identities 204, 210 may be used to address one of up to $2^M$ groups of UEs and one of up to $2^{L-M}$ UEs in each group. In the following example, a verification check is referred to as a "CRC check", a check identity is referred to as a "CRC check identity", and identity check bits are referred to as "CRC check identity bits". In this example, a UE may be configured with a second CRC check identity $y_3, \ldots, y_{L-1}$ having L bits and a first CRC check identity $x_0, \ldots, x_{M-1}$ having M-bits, such that the first set of CRC check identity bits 206 equals M of the L bits in the second set of CRC check identity bits 212. This construction thus enables $2^M$ groups of UEs wherein each group contains up to $2^{L-M}$ UEs such that a measurement assignment addressed to a group of UEs can be transmitted together with a data assignment addressed to a single UE. When sending an assignment on a physical control channel comprising data and measurement assignment to a first UE with a second CRC check identity $y_0^{(1)}, \ldots, y_{L-1}^{(1)}$ the network node constructs the CRC as:

$$b_k = \begin{cases} a_k & k = 0, \ldots, A-1 \\ p_{k-A} + y_{k-A}^{(1)} (\text{mod} 2) & k = A, \ldots, A+L-1 \end{cases}$$

A second UE performs a first CRC check using its M-bit first CRC check identity. If the second UE belongs to the same group as the first UE, then the second UE will obtain a successful first CRC check using its first CRC check identity. However, unless the first and second UEs are the same UE, a second CRC check using the second UE's second CRC check identity will fail. The second UE does not obtain the data, but the second UE is able to construct a measurement resource indicated in the assignment.

An example of how the solution may be employed in terms of actions in a procedure performed by a User Equipment, UE for handling a message transmitted by a network node over a radio link, will now be described with reference to the flow chart in FIG. 4, and with further reference to FIG. 2. This procedure can thus be used to accomplish the functionality described above, and some possible but non-limiting embodiments will also be described below.

Figure 3:
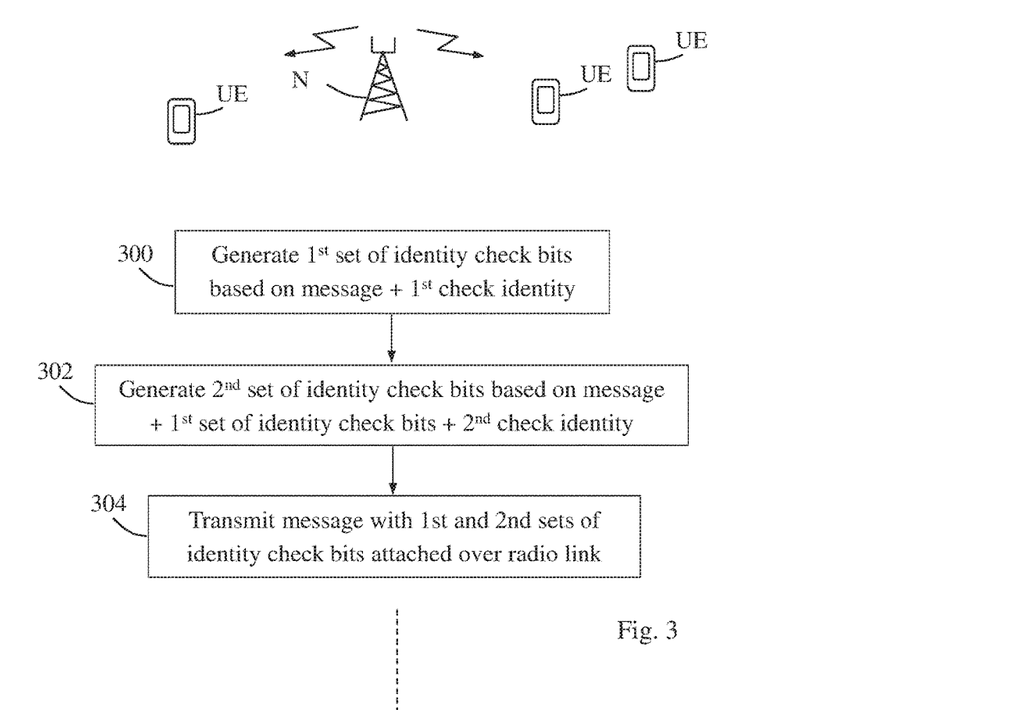
FIG. 3 is a flow chart illustrating a procedure in a network node, according to further possible embodiments.
Figure 4:
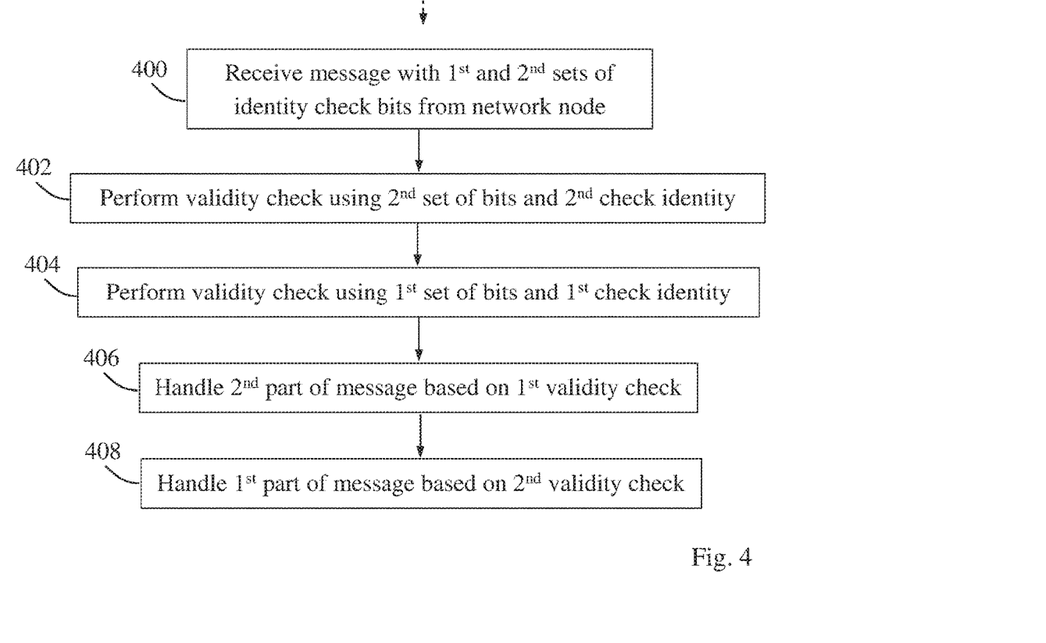
FIG. 4 is a flow chart illustrating a procedure in a UE, according to further possible embodiments.

The procedure shown in FIG. 4 may be performed by the UE after the network node has transmitted the message as of action 304 in FIG. 3. A first action 400 illustrates that the UE receives the message with a first set of identity check bits 206 and a second set of identity check bits 212 attached, wherein the UE has been configured with a first check identity 204 and a second check identity 210. In a next action 402, the UE performs a first verification check using the second set of identity check bits 212 and the second check identity 210. In a following action 404, the UE performs a second verification check using the first set of identity check bits 206 and the first check identity 204.

Another action 406 illustrates that the UE handles a second part 200B of the message based on the first verification check, and a further action 408 illustrates that the UE handles a first part 200A of the message based on the second verification check. Some further non-limiting embodiments are possible to employ which more or less correspond to some of the embodiments described above for the network node.

The UE will thus handle the first and second message parts depending on the outcome of the first and second verification checks, e.g. according to the following embodiments. In one possible embodiment, the UE processes the second part of the message when the first verification check has been successful. In another possible embodiment, the UE performs the second verification check only when the first verification check has been successful. In another possible embodiment, the UE processes the first part of the message when the second verification check has been successful, otherwise the first part of the message is ignored when the second verification check has failed.

In further possible embodiments, the first part of the message may comprise a data assignment for the UE to transmit or receive data on a subsequent radio resource, and the second part of the message may comprise control information. In another possible embodiment, the UE may use the first check identity for blind decoding of one or more assignment candidates in a predefined search space. In further possible embodiments, the UE may use the first and second sets of identity check bits 206, 212 to determine whether subsequently transmitted Medium Access Control, MAC, Protocol Data Units, PDUs should be processed or ignored. Some examples of how this can be done were described above with reference to the table 1.

Figure 5:
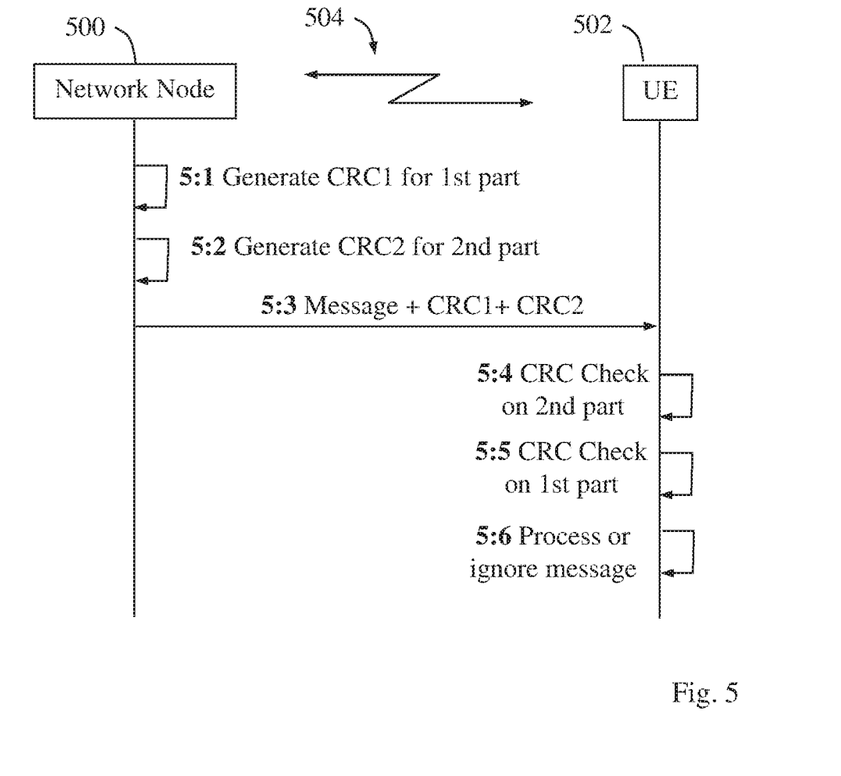
FIG. 5 is a signaling diagram illustrating how a network node and a UE may operate and communicate, according to further possible embodiments.

The signaling diagram in FIG. 5 illustrates an example of how a network node 500 and a UE 502 may operate and communicate when a message is transmitted from the network node 500 over a radio link 504. A first action 5:1 illustrates that the network node 500 generates a first set of identity check bits CRC1 valid for a first part of the message, based on the message and a first check identity. This action corresponds to action 300 in FIG. 3.

A further action 5:2 illustrates that the network node 500 generates a second set of identity check bits CRC2 valid for a second part of the message, based on the message, the first set of identity check bits CRC1 and a second check identity. This action corresponds to action 302 in FIG. 3. In a following action 5:3, the network node 500 transmits the message with the first and second sets of identity check bits CRC1, CRC2 attached over the radio link 504 such that the UE 504 receives the message. This action corresponds to action 304 in FIG. 3 and to action 400 in FIG. 4.

A further action 5:4 illustrates that the UE 502 performs a first verification check on the second part of the message using the second set of identity check bits and the second check identity. This action corresponds to action 402 in FIG. 4. In a further action 5:5, the UE 502 performs a second verification check using the first set of identity check bits and the first check identity. This action corresponds to action 404 in FIG. 4. A final action 5:6 illustrates that the UE 502 either processes or ignores the first and second message parts depending on the outcome of actions 5:4 and 5:5, respectively.

In more detail, the UE 502 will process the second message part if the first verification check in 5:4 was successful. If not successful, the UE 502 will ignore the second message part. Provided that the first verification check in action 5:4 was successful, the UE 502 will also process the first message part if the second verification check in action 5:5 was successful. If not successful, the UE 502 will ignore the first message part. Action 5:6 basically corresponds to actions 406 and 408 in FIG. 4.

Figure 6:
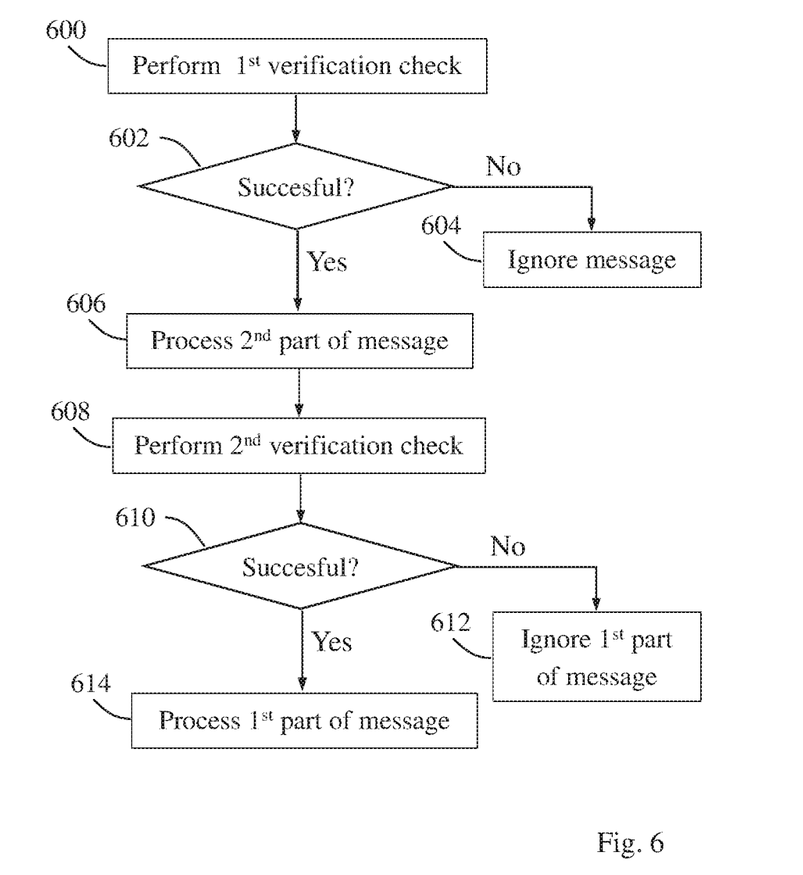
FIG. 6 is a flow chart illustrating a more detailed example of a procedure in a UE, according to further possible embodiments.

Another example of how the UE may operate when participating in any of the above-described procedures, will now be described with reference to the flow chart in FIG. 6. It is assumed that the network node has transmitted a message comprising first and second parts and with first and second sets of identity check bits attached, which is received by the UE. Having received the message with the first and second sets of identity check bits attached, a first action 600 illustrates that the UE performs a first verification check using the second set of identity check bits and the second check identity. This action corresponds to action 402 in FIG. 4. If it is found in an action 602 that the first verification check is not successful, the UE will ignore the message altogether in an action 604, and the process may thereby be terminated. On the other hand, If it is found in action 602 that the first verification check is successful, the UE processes the second part of the message in an action 606.

In a following action 608, the UE performs a second verification check using the first set of identity check bits and the first check identity. This action corresponds to action 404 in FIG. 4. If it is found in an action 610 that the second verification check is not successful, the UE ignores the first message part in an action 612, and the process may thereby be terminated. On the other hand, If it is found in action 610 that the second verification check is successful, the UE processes the first part of the message in an action 606. It should be noted that the actions 606 and 614 of processing the message parts may be performed in any order once both verification checks have been performed and evaluated, that is after action 610.

Figure 7:
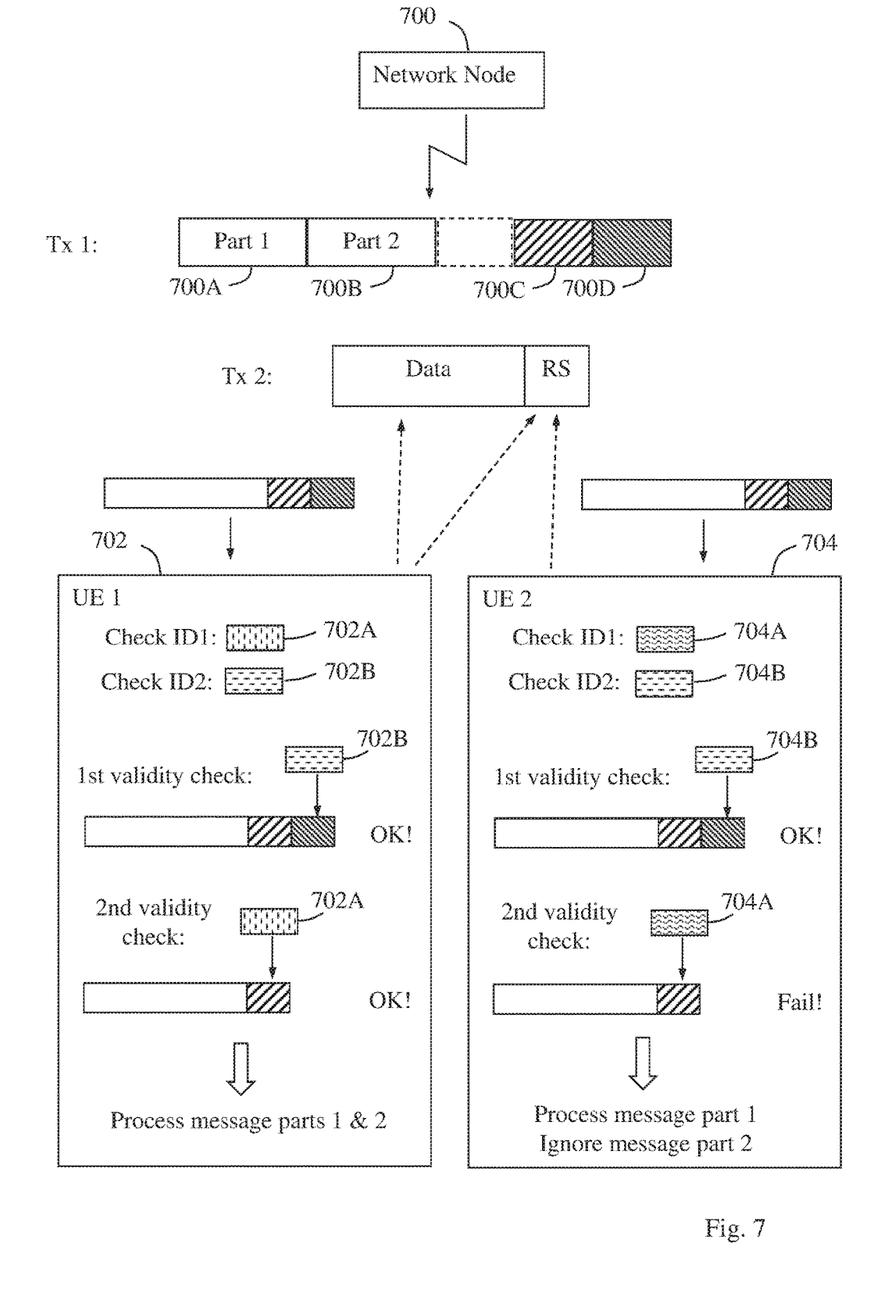
FIG. 7 is a schematic diagram illustrating an example of how two UEs may handle transmissions from a network node, according to further possible embodiments.

Another example of how two different UEs may operate for handling a transmitted message when participating in any of the above-described procedures, will now be described with reference to the diagram in FIG. 7. A network node 700 thus transmits a message, indicated as a first transmission Tx 1, the message comprising a first part 700A and a second part 700B and having a first set of identity check bits 700C and a second set of identity check bits 700D attached. It is assumed that the network node 700 has generated the first and second sets of identity check bits 700C, 700D in the manner described above for FIG. 2. The transmission Tx 1 is received by both UEs 702 and 704. It is further assumed that the first message part contains a data assignment and the second message part contains a measurement assignment.

The first UE 702 is configured with a first check identity 702A and a second check identity 702B. Further, the second UE 704 is configured with a first check identity 704A and a second check identity 704B, where its second check identity 704B is the same check identity as the second check identity 702B configured in UE 702, as illustrated by the same pattern in the figure. However, the first check identity 704A configured in UE 704 is different from the first check identity 702A configured in UE 702, as illustrated by different patterns in the figure. In this example, the network node 700 has generated the first set of identity check bits 700C based on the first check identity 702A configured in UE 702. Further, the network node 700 has generated the second set of identity check bits 700D based on the second check identity 702B, 704B configured in both UEs 702 and 704.

As a result, both UEs 702 and 704 are able to perform a first validity check successfully using the second check identity 702B, 704B, since the second set of identity check bits 700D was generated based on that second check identity 702B, 704B. However, only the UE 702 is able to perform a second validity check successfully using the first check identity 702A, since the first set of identity check bits 700C was generated based on that first check identity 702A. For the second UE 704, the second validity check fails since the first check identity 704A is used while the first set of identity check bits 700C was generated based on the first check identity 702A configured in the first UE 702 but not in the second UE 704.

The network node 700 further transmits Data and a reference signal RS which can be measured by UEs, indicated as a second transmission Tx 2. Due to the above-described outcome of the first and second validity checks, the first UE 702 will process both message parts 700A and 700B and follow the data and measurement assignments therein by decoding the data in Tx2 and also measuring the RS in Tx 2, as indicated by the two dashed arrows from UE 702.

On the other hand, the second UE 704 will process the second message part 700B and follow the measurement assignment therein by measuring the RS in Tx 2, as indicated by the single dashed arrow from UE 704, but it will ignore the first message part 700A.

A non-limiting example of how a network node and a User Equipment, UE may be structured to bring about the above-described solution and embodiments thereof, will now be described with reference to the block diagram in FIG. 8. In this figure, the network node 800 and the UE 802 may be configured to operate according to any of the examples and embodiments of employing the solution as described above, where appropriate, and as follows. Each of the network node 800 and the UE 802 is shown to comprise a processor "P", a memory "M" and a communication circuit "C" with suitable equipment for communicating radio signals in the manner described herein.

The communication circuit C in each of the network node 800 and the UE 802 thus comprises equipment configured for communication over a radio interface using a suitable protocol for radio communication depending on the implementation. The solution is however not limited to any specific types of messages or protocols. An example of such a communication was described above for FIG. 5.

The actions of FIGS. 3-6 may be performed by means of functional modules in the respective processors P in the network node 800 and the UE 802. For example, the network node 800 comprises means configured or arranged to perform the actions of the flow chart in FIG. 3 in the manner described above. Further, the UE 802 comprises means configured or arranged to perform the actions of the flow chart in FIG. 4 and at least some of the actions of the flow chart in FIG. 6 in the manner described above.

The network node 800 is arranged to transmit a message over a radio link. The network node 800 thus comprises the processor P and the memory M, said memory comprising instructions executable by said processor, whereby the network node 800 is operative as follows.

The network node 800 is operative to generate a first set of identity check bits valid for a first part of the message, based on the message and a first check identity. This operation may be performed by a generating module 800A in the network node 800, e.g. in the manner described for action 300 above. The network node 800 is also operative to generate a second set of identity check bits valid for a second part of the message, based on the message, the first set of identity check bits and a second check identity. This operation may be performed by the generating module 800A, e.g. in the manner described for action 302 above. The network node 800 is further operative to transmit the message with the first and second sets of identity check bits attached over the radio link. This operation may be performed by a transmitting module 800B in the network node 800, e.g. in the manner described for action 304 above.

The UE 802 is arranged to handle a message transmitted by a network node 800 over a radio link. The UE 802 comprises a processor P and a memory M, said memory comprising instructions executable by said processor whereby the UE 802 is operative as follows.

The UE 802 is operative to receive the message with a first set of identity check bits and a second set of identity check bits attached, wherein the UE has been configured with a first check identity and a second check identity. This receiving operation may be performed by a receiving module 802A in the UE 802, e.g. in the manner described for action 400 above. The UE 802 is also operative to perform a first verification check using the second set of identity check bits and the second check identity. This operation may be performed by a checking module 802B in the UE 802, e.g. in the manner described for action 402 above. The UE 802 is also operative to perform a second verification check using the first set of identity check bits and the first check identity. This operation may be performed by the checking module 802B, e.g. in the manner described for action 404 above.

The UE 802 is also operative to handle a second part of the message based on the first verification check. This operation may be performed by a handling module 802C in the UE 802, e.g. in the manner described for action 406 above. The UE 802 is also operative to handle a first part of the message based on the second verification check. This operation may be performed by the handling module 802C, e.g. in the manner described for action 408 above.

Figure 8:
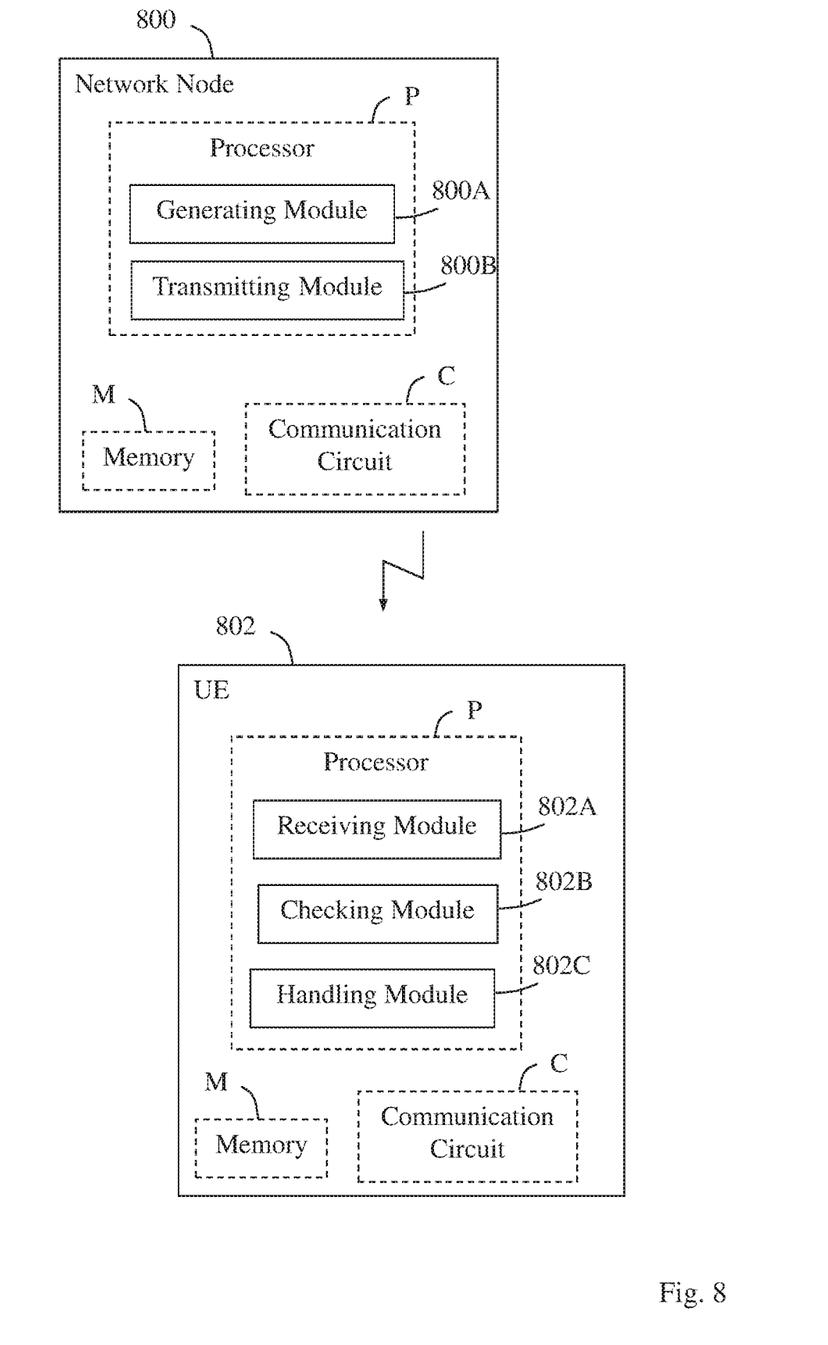
FIG. 8 is a block diagram illustrating a network node and a UE in more detail, according to further possible embodiments.

It should be noted that FIG. 8 illustrates various functional modules in the network node 800 and the UE 802, respectively, and the skilled person is able to implement these functional modules in practice using suitable software and hardware. Thus, the solution is generally not limited to the shown structures of the network node 800 and the UE 802, and the functional modules 800A-B and 802A-C therein may be configured to operate according to any of the features and embodiments described in this disclosure, where appropriate.

The functional modules 800A-B and 802A-C described above may be implemented in the network node 800 and the UE 802, respectively, by means of program modules of a respective computer program comprising code means which, when run by the processor P causes the network node 800 and the UE 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 800 and the UE 802 in the form of a memory having a computer readable medium and being connected to the processor P. The computer program product or memory M in each of the network node 800 and the UE 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 800 and UE 802.

The solution described herein may be implemented in each of the network node 800 and the UE 802 by a computer program comprising instructions which, when executed on at least one processor, cause the at least one processor to carry out the actions according to any of the above embodiments, where appropriate. The solution may also be implemented at each of the network node 800 and the UE 802 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "User Equipment UE", "message", "identity check bits", "check bit attachment" "check identity" and "verification check" have been used throughout this disclosure, although any other corresponding entities, functions, and/or parameters could also be used having the features and characteristics described here. The solution is defined by the appended claims.

The invention claimed is:

1. A method performed by a network node of a radio network, for transmitting a message over a radio link, the method comprising:
generating a first set of identity check bits valid for a first part of the message, based on the message and a first check identity;
generating a second set of identity check bits valid for a second part of the message, based on the message, the first set of identity check bits, and a second check identity; and
transmitting the message with the first and second sets of identity check bits attached over the radio link, wherein the second set of identity check bits is used to instruct a group of User Equipments (UEs) using the second check identity, to process the second part of the message, and the first set of identity check bits is used to instruct a single UE using the first check identity, to process the first part of the message, and wherein the first check identity has M bits and the second check identity has L bits including said M bits, such that the first and second check identities are used to address one of up to $2^M$ groups of UEs and one of up to $2^{L-M}$ UEs in each group of UEs.

2. The method according to claim 1, wherein the first part of the message comprises a data assignment for transmitting or receiving data on a subsequent radio resource and the first check identity is used to address a first UE and wherein the second part of the message comprises control information and the second check identity is used to address the first UE and at least a second UE.

3. The method according to claim 1, wherein the first check identity is generated from an identity of the single UE and the second check identity is generated from an identity of the group of UEs.

4. The method according to claim 1, wherein the first part of the message comprises a data assignment for transmitting or receiving data on a subsequent radio resource and the first check identity is used by a first UE, and wherein the second part of the message comprises a data assignment for transmitting or receiving data on another subsequent radio resource and the second check identity is used by a second UE.

5. The method according to claim 1, wherein the first set of identity check bits is an inner Cyclic Redundancy Check (CRC) attachment following the message and the second set of identity check bits is an outer CRC attachment following the first set of identity check bits.

6. The method according to claim 1, wherein the network node configures a UE with the first check identity for use in blind decoding of one or more assignment candidates in a predefined search space.

7. The method according to claim 1, wherein the first and second sets of identity check bits are used to control processing of subsequently transmitted Medium Access Control (MAC) Protocol Data Units (PDUs).

8. The method according to claim 1, wherein the first and second sets of identity check bits are generated as Cyclic Redundancy Check (CRC) bits.

9. The method according to claim 2, wherein the control information comprises a measurement assignment for measuring or transmitting a reference signal.

10. A network node arranged to transmit a message over a radio link, the network node comprising a processor (P) and a memory (M), said memory comprising instructions executable by said processor whereby the network node is operative to:
generate a first set of identity check bits valid for a first part of the message, based on the message and a first check identity;
generate a second set of identity check bits valid for a second part of the message, based on the message, the first set of identity check bits, and a second check identity; and
transmit the message with the first and second sets of identity check bits attached over the radio link, wherein the second set of identity check bits is used to instruct a group of User Equipments (UEs) using the second check identity, to process the second part of the message, and the first set of identity check bits is used to instruct a single UE using the first check identity, to process the first part of the message, and wherein the first check identity has M bits and the second check identity has L bits including said M bits, such that the first and second check identities are used to address one of up to $2^M$ groups of UEs and one of up to $2^{L-M}$ UEs in each group of UEs.

11. The network node according to claim 10, wherein the first part of the message comprises a data assignment for transmitting or receiving data on a subsequent radio resource and the first check identity is used to address a first UE; and wherein the second part of the message comprises control information and the second check identity is used to address the first UE and at least a second UE.

12. The network node according to claim 10, wherein the first check identity is generated from an identity of the single UE and the second check identity is generated from an identity of the group of UEs.

13. The network node according to claim 10, wherein the first part of the message comprises a data assignment for transmitting or receiving data on a subsequent radio resource and the first check identity is used by the first UE, and wherein the second part of the message comprises a data assignment for transmitting or receiving data on another subsequent radio resource and the second check identity is used by a second UE.

14. The network node according to claim 10, wherein the first set of identity check bits is an inner Cyclic Redundancy Check (CRC) attachment following the message and the second set of identity check bits is an outer CRC attachment following the first set of identity check bits.

15. The network node according to claim 10, wherein the network node configures a UE with the first check identity for use in blind decoding of one or more assignment candidates in a predefined search space.

16. The network node according to claim 10, wherein the first and second sets of identity check bits are used to control processing of subsequently transmitted Medium Access Control (MAC) Protocol Data Units (PDUs).

17. The network node according to claim 10, wherein the first and second sets of identity check bits are generated as Cyclic Redundancy Check (CRC) bits.

18. The network node according to claim 11, wherein the control information comprises a measurement assignment for measuring or transmitting a reference signal.

19. A method performed by a User Equipment (UE) for handling a message transmitted by a network node over a radio link, the method comprising:
receiving the message with a first set of identity check bits and a second set of identity check bits attached, wherein the UE has been configured with a first check identity and a second check identity;
performing a first verification check using the second set of identity check bits and the second check identity;
performing a second verification check using the first set of identity check bits and the first check identity;
handling a second part of the message based on the first verification check; and
handling a first part of the message based on the second verification check, wherein the second set of identity check bits is used to instruct a group of UEs using the second check identity, to process the second part of the message, and the first set of identity check bits is used to instruct a single UE using the first check identity, to process the first part of the message, and wherein the first check identity has M bits and the second check identity has L bits including said M bits, such that the first and second check identities are used to address one of up to $2^M$ groups of UEs and one of up to $2^{L-M}$ UEs in each group of UEs.

20. The method according to claim 19, wherein the UE processes the second part of the message when the first verification check has been successful.

21. The method according to claim 19, wherein the first part of the message comprises a data assignment for the UE to transmit or receive data on a subsequent radio resource, and wherein the second part of the message comprises control information.

22. The method according to claim 19, wherein the UE uses the first and second sets of identity check bits to determine whether subsequently transmitted Medium Access Control (MAC) Protocol Data Units (PDUs) should be processed or ignored.

23. The method according to claim 20, wherein the UE performs the second verification check only when the first verification check has been successful.

24. The method according to claim 21, wherein the UE uses the first check identity for blind decoding of one or more assignment candidates in a predefined search space.

25. The method according to claim 23, wherein the UE processes the first part of the message when the second verification check has been successful, otherwise the first part of the message is ignored when the second verification check has failed.

26. A User Equipment (UE) arranged to handle a message transmitted by a network node over a radio link, the UE comprising a processor (P) and a memory (M), said memory comprising instructions executable by said processor whereby the UE is configured to:

receive the message with a first set of identity check bits and a second set of identity check bits attached, wherein the UE has been configured with a first check identity and a second check identity;
perform a first verification check using the second set of identity check bits and the second check identity;
perform a second verification check using the first set of identity check bits and the first check identity;
handle a second part of the message based on the first verification check; and
handle a first part of the message based on the second verification check, wherein the second set of identity check bits is used to instruct a group of UEs using the second check identity, to process the second part of the message, and the first set of identity check bits is used to instruct a single UE using the first check identity, to process the first part of the message; and wherein the first check identity has M bits and the second check identity has L bits including said M bits, such that the first and second check identities are used to address one of up to $2^M$ groups of UEs and one of up to $2^{L-M}$ UEs in each group of UEs.

27. The UE according to claim 26, wherein the UE processes the second part of the message when the first verification check has been successful.

28. The UE according to claim 26, wherein the UE uses the first and second sets of identity check bits to determine whether subsequently transmitted Medium Access Control (MAC) Protocol Data Units (PDUs) should be processed or ignored.

29. The UE according to claim 27, wherein the UE performs the second verification check only when the first verification check has been successful.

30. The UE according to claim 29, wherein the UE processes the first part of the message when the second verification check has been successful, otherwise the first part of the message is ignored when the second verification check has failed.

31. The UE according to claim 30, wherein the first part of the message comprises a data assignment for the UE to transmit or receive data on a subsequent radio resource, and wherein the second part of the message comprises control information.

32. The UE according to claim 31, wherein the UE uses the first check identity for blind decoding of one or more assignment candidates in a predefined search space.

* * * * *